Patented May 28, 1929.

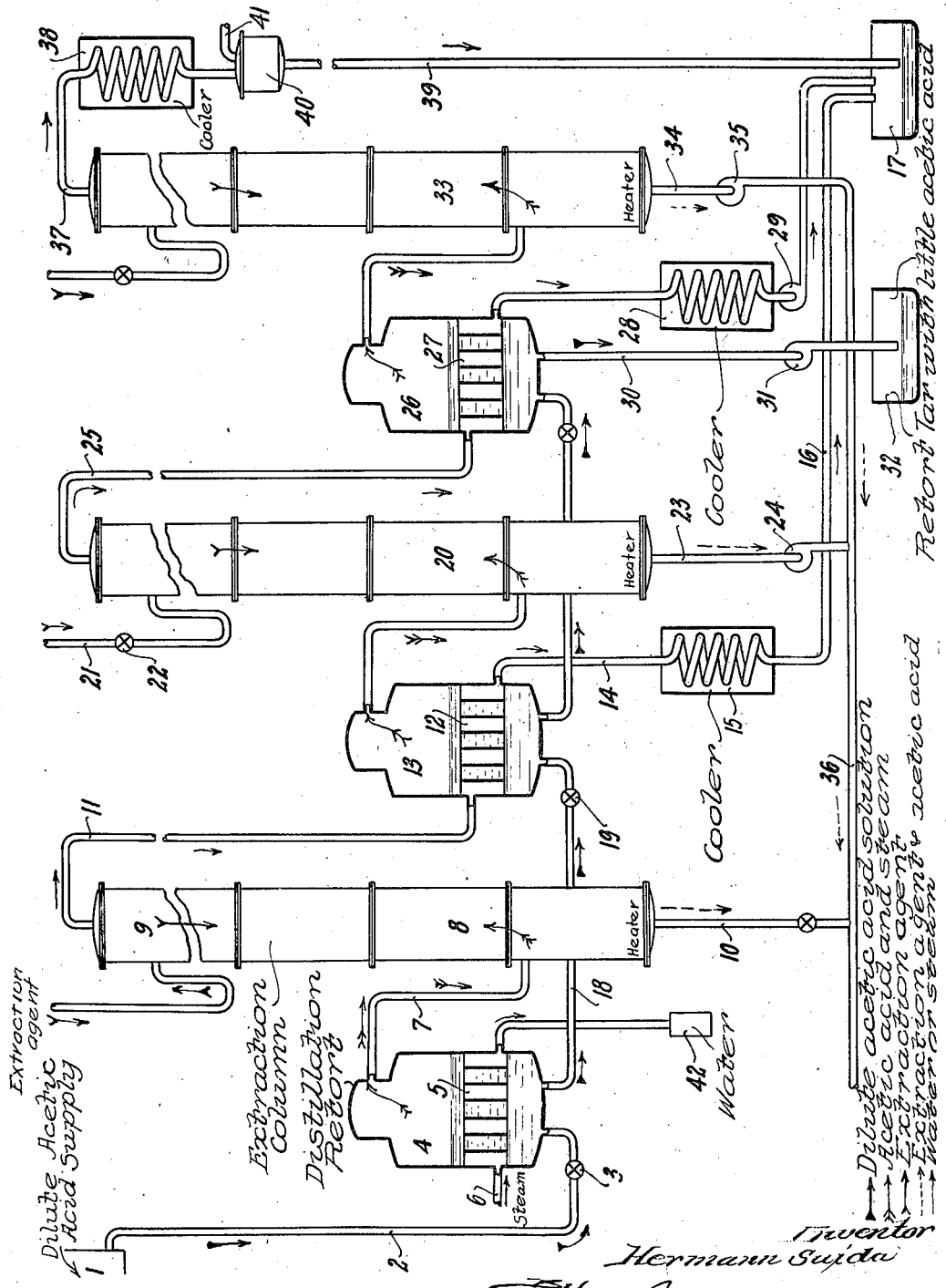

1,715,313

UNITED STATES PATENT OFFICE.

HERMANN SUIDA, OF MODLING, NEAR VIENNA, AUSTRIA.

PROCESS FOR THE DISTILLATION AND VAPOR PHASE EXTRACTION OF VOLATILE SUBSTANCES.

Application filed February 9, 1926, Serial No. 87,123, and in Austria February 21, 1925.

The invention relates to a process for the distillation and vapor phase extraction of volatile substances, by means of which from diluted, especially aqueous solutions, the dissolved substance, capable of being vaporized together with the solvent, can be recovered in a concentrated condition in a single process by means of a multiple apparatus. The arrangement is such that an extraction apparatus is inserted between each two distilling retorts and that the vapor mixture of solvent and dissolved substance produced in the preceding retort is subjected to extraction in the following extraction column, whereas the constituents of the solution which remain unvaporized pass directly from one distilling retort into the adjacent distilling retort which is subjected to a lower pressure than the immediately preceding retort.

The advantage obtained in this manner is essentially of a thermo-economical nature, since the water vapors or other solvent vapors which flow off from each extraction column, being practically freed from dissolved substance, serve for heating the adjacent distilling retort, in which the boiling temperature is lower, on account of the lower pressure therein. It is already known, that the heat consumption for effecting the evaporation may be considerably reduced by stepwise vaporization of a liquid in several, successively arranged vessels, and by stepwise decreasing the pressure in the various vessels, as, for example, in the multiple evaporating apparatus of various constructions and with various pressure stages.

The present invention provides a method in which this heat utilization of the multiple apparatus evaporation is usefully employed when the concentration of a dilute solution is to be effected by means of extraction. This working of the method requires a modification of the known methods and of the apparatus utilized for effecting the known methods, since the vapors issuing from the evaporation vessel cannot be directly employed for the evaporation of liquids in a second boiling vessel. These vapors must first be brought into contact with an extraction agent in an adjoining extraction column, and the water vapors which issue from the said column after the extraction has been effected, and which are freed from the dissolved substance are then employed for heating a second evaporating vessel. The evaporation and extraction in the second stage takes place at a lower pressure than in the first stage. In this way more than two evaporation and extraction stages may be arranged in series, as in the known multiple apparatus evaporation. Although, by this arrangement, when two, three or four aggregates are employed, the heat consumption is not reduced to ½, ⅓ or ¼ of that required with the usual working method, the heat expenditure is, on account of this arrangement, so materially reduced that the cost of carrying out the entire extraction process is considerably reduced.

The method of the present invention will be explained by means of the annexed schematical drawing. The concentration of aqueous diluted acetic acid will now be described by way of example only.

The crude, diluted pyroligneous acid or diluted acetic acid of other orign flows from the reservoir 1 through the conduit 2 controlled by the cock 3 into the boiling vessel 4 and is partly vaporized on its travel through the heating system 5 which is supplied at 6 with steam. The vapors of acetic acid and water then pass through the conduit 7 into the lower part of the extraction apparatus 8 and are brought into contact with a solvent of high boiling point which enters the upper part of said apparatus at 9. Solvents suitable for this purpose are set forth in my U. S. Letters Patent No. 1,621,441, dated March 15, 1927, and No. 1,624,810, dated April 12, 1927. A heating device not (shown in the drawing) arranged in the lower part of the extraction apparatus serves to heat the mixture of acetic acid-and-water vapor. This arrangement is suitable for the concentration of acetic acid, but, as will be obvious, can be omitted in the extraction of other aqueous solutions. The extraction agent laden with concentrated acetic acid flows through the tube 10 into the collecting conduit 36; the water vapors freed from acetic acid escape at the top of the column through the tube 11 and pass through the heating member 12 of the second boiling vessel 13. The aqueous condensate of these vapors is directed through the cooler 15 and flows through the tube 16 into the collecting vessel 17, whereas the aqueous condensate from the boiling vessel 4 is drawn into a vessel 42. The liquid which remains unvaporized in the vessel 4 passes from the boiling vessel 4 through the conduit 18 past a throttle valve 19 into the boiling vessel 13, where a part of the diluted aqueous acetic acid is again vaporized, because the boiling temperature in the vessel 13 is lower than that in the boiling vessel 4, since the vessel 13 is kept at a lower pressure than the vessel 4. The vapors of acetic acid and water issuing from the vessel 13 are extracted in the extraction column 20 in a similar manner as in the column 8. The extraction agent flows from the tube 21 through the cock 22 into the extraction column 20 and is conveyed through a tube 23 in the bottom by means of a pump 24, into the collecting conduit 36, since the pressure is reduced in the boiling vessel 13 and in the associated column 20. The water vapors, freed from acetic acid, leave the column 20 through the tube 25 and serve to heat the retort 26 as they flow through the heating member 27. The condensates are cooled in the cooler 28 and conveyed by a pump 29 into the collecting vessel 17.

The vaporization in the three boiling vessels is so regulated that retort-tar nearly free of crude acetic acid is drawn off from the boiling vessel 26 through the conduit 30 by the pump 31 and is collected in the vessel 32. The treatment of crude acetic acid in the manner described has the advantage that the retort-tar must be removed only from the last boiling vessel. The vapors from the boiling vessel 26 in which a still lower pressure prevails than in the vessel 13, are extracted in the column 33 in the manner described. The extraction agent laden with concentrated acetic acid is drawn off at 34 by the pump 35 and conducted to the collecting conduit 36, whereas the water vapors freed from acetic acid leave the column at the top at 37, are condensed in the cooler 38 and automatically directed through a descending tube 39 into the collecting vessel 17, in which case the length of the descending tube must be adjusted to the pressure prevailing in the boiling vessel 26. An air pump, (not shown in the drawing) is connected by means of the conduit 41 to the separator 40 and serves for the removal of uncondensed escaping gases.

The collected extracts are drawn off from the conduit 36 and are then further worked up in known manner.

The described method for concentrating acetic acid is carried out in such manner that, at the commencement, the pressure is that of the atmosphere or a higher pressure, the pressure being reduced in the final stage to a few tenths of an atmosphere. It is, however, obvious that the start may be made with higher pressures and that the differences in pressure may be chosen in accordance with the working conditions employed for the time being.

The method which has been described, by way of example, for acetic acid is suitable also for the concentration of other diluted fatty acids or other aqueous solutions.

What I claim and desire to protect by Letters Patent is:

1. In combination with a multiple stage process of distillation, the method of extracting in concentrated form a substance in solution in a solvent and volatile with the solvent which comprises distilling the solution in successive stages under successively decreasing pressures, bringing the vapors from each distillation stage into contact with an extraction agent of higher boiling point than said substance, and utilizing the extracted vapors for heating the solution in corresponding successive stages to effect distillation thereof.

2. In combination with a multiple stage process of distillation, the method of extracting in concentrated form a substance in solution in a solvent and volatile with the solvent which comprises distilling the solution in successive stages under successively decreasing pressures, maintaining on the first of said stages a pressure higher than atmospheric, bringing the vapors from each distillation stage into contact with an extraction agent of higher boiling point than said substance, and utilizing the extracted vapors from the different stages for heating solution in corresponding successive stages to effect distillation thereof.

3. The method of obtaining concentrated acetic acid from dilute aqueous solutions containing the same which comprises distilling the aqueous solution in successive stages maintained under successively decreasing pressures, subjecting the resultant mixed vapors of acetic acid and water from each stage to extraction with an extraction agent of higher boiling point than of acetic acids drawing off the extract, utilizing the water vapors substantially freed of acetic acid from each stage for heating the dilute acetic acid solution in the next succeeding stage, and condensing and collecting said water vapors.

In testimony whereof I have signed my name to this specification.

HERMANN SUIDA.